United States Patent [19]

Silvano et al.

[11] Patent Number: 5,430,132

[45] Date of Patent: * Jul. 4, 1995

[54] SEMI-SYNTHETIC GLYCOSAMINOGLYCANS CONTAINING α-L-GALACTURONIC ACID SUBSTITUTED WITH NUCLEOPHILIC GROUPS IN POSITION 3

[75] Inventors: Piani Silvano; Marchi Egidio; Tamagnone Gianfranco; Ungarelli Fabrizio, all of Bologna, Italy

[73] Assignee: Alfa Wassermann S.p.A., Alanno, Italy

[ * ] Notice: The portion of the term of this patent subsequent to May 16, 2012 has been disclaimed.

[21] Appl. No.: 46,247

[22] Filed: Apr. 13, 1993

[30] Foreign Application Priority Data

Apr. 17, 1992 [IT] Italy .................. B092A0140

[51] Int. Cl.[6] ................ C08B 37/10; A61K 31/725
[52] U.S. Cl. .................. 536/21; 536/124; 514/8; 514/56; 530/322; 530/345
[58] Field of Search .............. 514/56, 8; 536/124, 536/21; 530/322, 345

[56] References Cited

U.S. PATENT DOCUMENTS

| | | | |
|---|---|---|---|
| 4,987,223 | 1/1991 | Choay et al. | 536/17.7 |
| 5,010,063 | 4/1991 | Piani et al. | 514/56 |
| 5,104,860 | 4/1992 | Piani et al. | 514/56 |
| 5,200,523 | 4/1993 | Fleet | 546/220 |

FOREIGN PATENT DOCUMENTS

0347588 5/1989 European Pat. Off. .
0380943 8/1990 European Pat. Off. .

OTHER PUBLICATIONS

Carey, F. A.; Sundberg, R. J. "Advanced Organic Chemistry—Part B: Reactions and Synthesis" 2nd ed. Plenum Press, N.Y. 1983, pp. 498–501.

Morrison, R. T.; Boyd, R. N. "Organic Chemistry" 4th ed. Allyn and Bacon, Boston 1983, pp. 549–550.

Jaseja et al. Can. J. Chem. 1989, 67, 1449–1456.

*The Merck Index*, Merck and Co., Inc. 1989, Eleventh Edition, Monograph No. 4571, p. 4575.

*Primary Examiner*—Douglas W. Robinson
*Assistant Examiner*—Kathleen Kahler Fonda
*Attorney, Agent, or Firm*—Bucknam and Archer

[57] ABSTRACT

New heparin and heparan sulfate derivatives having antithrombotic activity, also endowed with reduced haemorrhagic and anticoagulant activity, are obtained by nucleophilic addition to heparin and heparan sulfate derivatives containing 2,3-anhydrogulonic acid residues. The new products have the formula IV

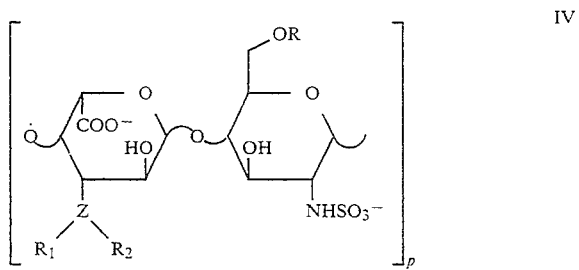
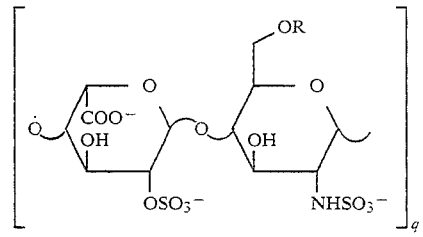
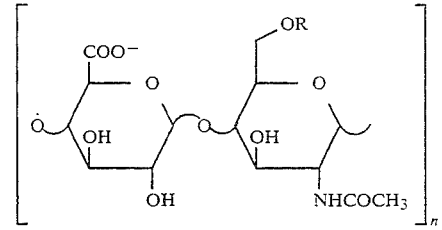

(Abstract continued on next page.)

Abstract—continued and show a structural modification of the unit of α-L-iduronic acid 2-O-sulfate with the partial or total selective modification to α-L-galacturonic acid in which the hydroxyl group in position 3 is replaced with a nucleophilic residue. This structural modification produces an improvement of the biological properties of the heparin and heparan sulfate, substantially keeping the antithrombotic activity while diminishing the haemorragic effect in vivo and the anticoagulant activity in vitro.

20 Claims, No Drawings

SEMI-SYNTHETIC GLYCOSAMINOGLYCANS CONTAINING α-L-GALACTURONIC ACID SUBSTITUTED WITH NUCLEOPHILIC GROUPS IN POSITION 3

BACKGROUND OF THE INVENTION

In the published European patent application EP 0347588 a description was given of a structural modification, in basic medium, of glycosaminoglycans with heparin and heparan structure with subsequent isolation from the reaction mixture of new derivatives with respect to the state of the art, as demonstrated unmistakably by the chemical and physical characteristics and especially by the $^{13}$C-NMR spectrum.

In the subsequent published European patent application EP 0380943 a further structural modification was described, in a basic or neutral medium, which, starting from the products formed in the reaction conditions described in EP 0347588, and from the glycosaminoglycans with heparin or heparan structure used as starting products in EP 0347588, originated a range of new products, different from those described in EP 0347588 and new with respect to the state of the art, as demonstrated unmistakably by the chemical and physical characteristics and especially by the $^{13}$C-NMR spectrum.

The chemical and physical characteristics of the products described in EP 0347588 and the results of a subsequent structural study described by Jaseia M., Rej R., Sauriol F., Perlin A. S. in Can. J. Chem 67, 1449–56 (1989), with the specific object of explaining the mechanism of the reaction of structural modification in a basic medium, have demonstrated that these derivatives show a modification which relates just one of the saccharide units characteristic of glycosaminoglycans with heparin or heparan structure, more specifically the unit of α-L-iduronic acid sulfated in position 2 and involving its transformation into a 2,3-epoxygulonic unit.

Likewise it has been demonstrated that semi-synthetic glycosaminoglycans with one 2,3-epoxygulonic unit and also glycosaminoglycans with heparin or heparan structure, under conditions of reaction similar to those described in EP 0380943, undergo a structural modification which also involves the saccharide unit of α-L-iduronic acid sulfated in position 2 and involving the transformation of this saccharide unit into a unit of non-sulfated α-L-iduronic acid or α-L-galacturonic acid, according to the conditions of reaction used.

So EP 0347588 describes semi-synthetic glycosaminoglycans containing an epoxy function between positions 2 and 3 of the unit of α-L-iduronic-2-O-sulfate acid taken as a starting point and the conditions of reaction necessary for obtaining them, while EP 0380943 describes products deriving from further transformation of the epoxide, confirmed as having one unit of non-sulfated α-L-iduronic or α-L-galacturonic acid, and the conditions of reaction necessary for obtaining them starting from the epoxyde itself or, as an alternative, starting from the glycosaminoglycans with heparin or heparan structure themselves, used as starting products in EP 0347588.

SUMMARY OF THE INVENTION

The object of the present invention is to provide new semi-synthetic glycosaminoglycans characterized by the fact that they contain α-L-galacturonic acid substituted in position 3 by a nucleophilic group, instead of the α-L-iduronic-2-O-sulfate acid characteristic of natural glycosaminoglycans with heparin or heparan structure. The configuration of the uronic residue differing from that of the glycosaminoglycans with heparin or heparan structure was determined according to chemical and physical data, and particularly in accordance with the $^{13}$C-NMR spectrum. The new products claimed in the present patent application represent a further development as regards the state of the art and, in particular, as regards the above-mentioned published European patent applications. Indeed, in the latter patents, products were claimed which were obtained in basic aqueous medium, using water as nucleophile. In the present patent application the new products are obtained by reaction with a series of carefully selected nucleophilic reagents and in such conditions as to obtain the transformation of the unit of α-L-iduronic-2-O-sulfate acid, characteristic of glycosaminoglycans with heparin and heparan structure, into a unit of α-L-galacturonic acid substituted in position 3 with the nucleophilic group.

Another object of the invention consists of the process for obtaining the above-mentioned products starting from a suitable nucleophilic reagent and from the epoxides described in EP 0347588.

To better define the field of the present invention, it should be pointed out that the expression glycosaminoglycans with heparin or heparan structure is intended to indicate polysaccharides with a molecular weight of between about 3000 and about 50000 Daltons and characterized by the fact of possessing a disaccharide unit consisting of a uronic acid (which may be α-L-iduronic or β-D-glucuronic) and of α-D-glucosamine, connected, in alternate sequences, by 1,4-glycosidic bonds as described by Lindhal U., Kjellen L. in Thrombosis and Haemostasis 66, 44–48 (1991) and by Turnbull J. E., Gallagher J. T. in Biochem. J. 273, 553–559 (1991). Since the α-L-iduronic acid can be sulfated in position 2 and the glucosamine can be N-acetylated, N-sulfated, 6-O-sulfated, 3-O-sulfated, according to the variable positions of the substitutes, at least 10 different disaccharide units are possible, whose combination may generate a large number of different sequences. Bearing in mind the most represented disaccharide units and the most frequent sequences, we can say with reasonable approximation, that the general formula I can be attributed to glycosaminoglycans with heparin or heparan structure

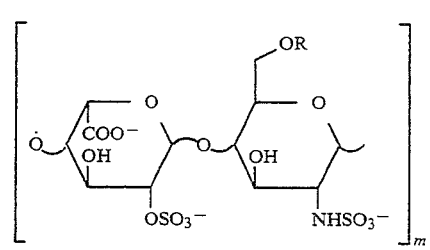

I

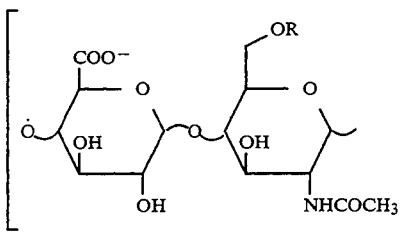

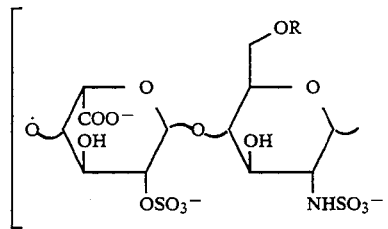

in which R represents hydrogen or the sulfate residue (SO⁻₃) and in which m and n are whole numbers between 1 and 100.

In heparin structured glycosaminoglycans of natural origin the value of m is high and the disaccharide unit A represents about 80% of the disaccharide units: on the contrary, in heparan structured glycosaminoglycans of natural origin the value of n is high and the disaccharide unit B represents about 80% of the disaccharide units.

The general formula I and the subsequent general formulae III and IV are intended to reveal the composition of the main saccharide units but make no reference to their sequence.

As is known to people in this field, it is possible to make a chemical modification of glycosaminoglycans of natural origin, for example by reactions of N-desulfatation, possibly followed by reactions of N-acetylation, thus also obtaining semi-synthetic N-desulfated heparins or N-desulfated-N-acetylated heparins. In addition, these glycosaminoglycans, whether natural or semi-synthetic, may be subjected to depolymerization processes by means of which the molecular weight is taken to levels generally between 3000 and 10000Daltons.

The structural modification of the present invention for obtaining new semi-synthetic glycosaminoglycans involves the partial or total transformation of the saccharide unit of α-L-iduronic-2-O-sulfate acid into a saccharide unit of α-L-galacturonic acid substituted by a nucleophilic group in position 3, with the subsequent disappearance of the heparin or heparan structure. This structural modification can be done on any type of compound with heparin or heparan structure. Indeed, besides being selective, the chemical process described in this invention can be applied to glycosaminoglycans with heparin or heparan structure which present all the possible sequences; i.e. it is independent of the type and of the level of functionalization of the saccharide unit which precedes or follows in the sequence the unit of α-L-iduronic-2-O-sulfate acid which is the object of the reaction of structural modification.

The structure of the new products is represented by the general formula IV

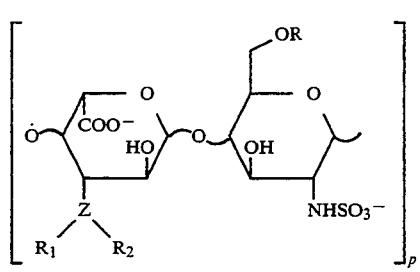

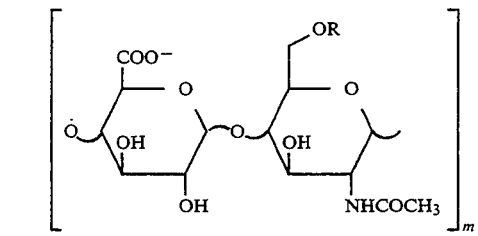

in which p+q=m, with p other than 0, and m, n and R have the meaning above, and in which —Z(R₂)R₁ is the nucleophilic group introduced through the process described in this invention. The compounds obtained in this way will be indicated as semi-synthetic glycosaminoglycans of general formula IV in which —Z(R₂)R₁ corresponds to the nucleophilic group.

The reaction of structural modification which involves the modification from saccharide unit of α-L-iduronic-2-O-sulfate acid into saccharide unit of α-L-galacturonic acid, with the introduction of the nucleophilic group in position 3 of the α-L-galacturonic acid, does not lead to the depolymerization of the glycosaminoglycans or alteration in the distribution of the molecular weight of the polysaccharide chains which form them, and for this reason the present reaction can be applied to glycosaminoglycans with heparin or heparan structure of any molecular weight. The products obtained can however be subjected to the known processes of chemical or enzymatic depolymerization.

DETAILED DESCRIPTION OF THE INVENTION

The present invention relates to new semi-synthetic glycosaminoglycans in which one of the saccharide units characteristic of glycosaminoglycans with heparin or heparan structure of general formula I

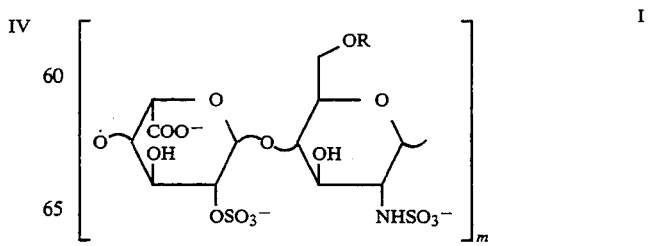

-continued

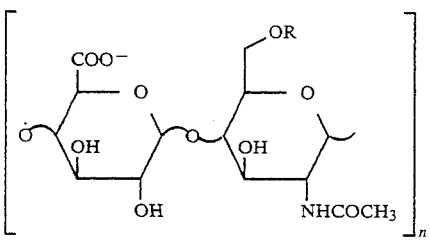

in which R represents hydrogen or the sulfate residue ($SO^-_3$) and m and n are whole numbers with values between 1 and 100, has undergone a structural modification with partial or total transformation of the α-L-iduronic-2-O-sulfate acid to α-L-galacturonic acid substituted in position 3 by a nucleophilic group of general formula II

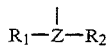     II with formation of new semi-synthetic glycosaminoglycans of general formula IV

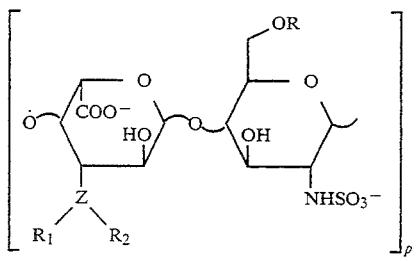     IV

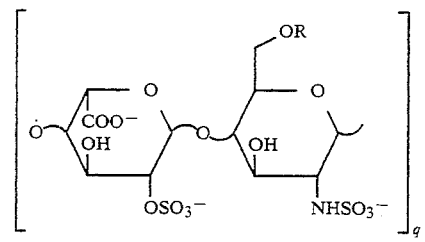

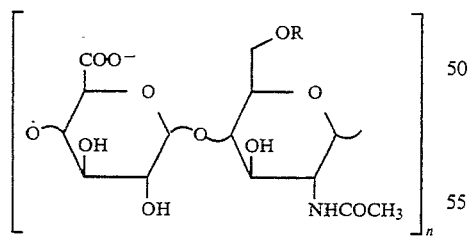

in which p+q=m, with p other than 0, and m, n and R have the meaning defined above.

All the nucleophilic reagents may be used to advantage in carrying out this invention and in fact the group —$Z(R_2)R_1$ is contained in any type of nucleophilic reagent.

More specifically, Z is oxygen, sulphur or nitrogen, $R_1$ represents a straight $C_1$–$C_{12}$ or branched ($C_{3-12}$) alkyl, amino, aromatic, diazo or hydroxy group, substituted or not substituted, and $R_2$ is zero or hydrogen or a straight $C_1$–$C_6$ alkyl, or branched ($C_{3-6}$) alkyl, or taken with $R_1$ forms a heterocyclic ring. The substituents of the group $R_1$ are selected from halogen, substituted or unsubstituted amino, aromatic, carboxy, guanidino, nitro, hydroxy, sulfonic, sulfuric, mercapto or ureido groups.

The groups derived from primary or secondary amines, secondary heterocyclic amines, aminoalcohols, aminothiols, amino acids, aminoesters, peptides, alcohols, phenols, nercaptans, dithiols, thiophenols, hydroxylamines, hydrazines, hydrazides and sodium azide are preferred in carrying out the present invention.

Particularly preferable in the present invention are the groups —$Z(R_2)R_1$ originating from the following nucleophilic reagents: glycine, glycylglycine, L-cysteine, acetyl-L-cysteine, L-cysteine ethyl ester, 2-aminothiophenol, 1,3-propanedithiol, cysteamine, sodium azide, 2-aminoethyl bisulfate, taurine, thioglycolic acid, β-alanine ethyl ester, L-cystine, hydroxylamine, glycyltaurine, cysteinyltaurine, glycylcysteine, glycylphenylalanine, glycyltyrosine, 2-aminoethanol, glycine 2-aminoethyl ester, glycine 2-hydroxyethylamide, arginyllysine, arginine, lysine, acetic acid 2-aminoethyl ester, salicylic acid, methionine, glycylproline, δ-aminobutyric acid, lysylprolylarginine, threonyllysylproline, threonyllysine, prolylarginine, lysylproline, choline, 4-(3-aminopropyl)-2-hydroxybenzoic acid and 4-(2-aminoethyl)-2-hydroxybenzoic acid.

Another object of the present invention is the process used for synthesizing semi-synthetic glycosaminoglycans of general formula IV starting from semi-synthetic glycosaminoglycans with 2,3 epoxygulonic structure of general formula

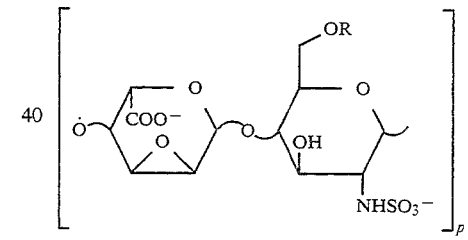     III

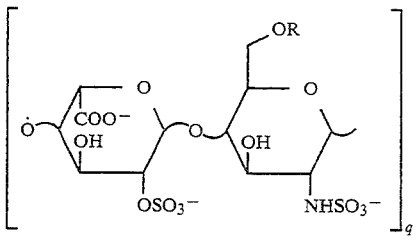

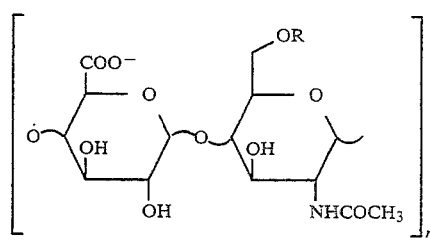

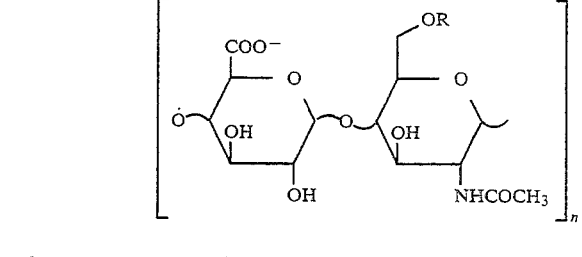

where p, q, n and R have the meaning indicated above, obtained according to the process described in the published European patent application EP 0347588.

The process for obtaining semi-synthetic glycosaminoglycans of general formula IV involves reacting a semi-synthetic glycosaminoglycan with 2,3 epoxygulonic structure of general formula III with a nucleophilic reagent which contains the group of general formula II, in the presence of a solvent and a quantity of inorganic or organic base capable of salifying any acidic groups present in the nucleophilic reagents and/or to free the same nucleophilic reagents from any salts with substances of an acidic nature and to generate such an excess of alkalinity that the reaction mixture is between 0.01 and 5N as regards the base used, preferably from 1 to 3N. The reaction is carried out by adding the semi-synthetic glycosaminoglycan of formula III to a solution containing the nucleophilic reagent and the inorganic or organic base. The same nucleophilic reagent can act as a base: when methylamine is used as nucleophilic agent, for example, it is also used as a base and so the addition of another base is unnecessary.

The solvent is water or the polar solvents dimethylacetamide, dimethyl formamide, acetonitrile, dioxane, tetrahydrofuran, in mixture with water.

The reaction mixture is kept under stirring, possibly in an atmosphere of inert gases, preferably nitrogen, where the nucleophilic reagent is easily oxidizable, at a temperature of between 35° C. and 95° C., preferably between 50° C. and 70° C., for a period of time of between 30 minutes and 24 hours, preferably between 2 and 6 hours.

At the end of the reaction, the reaction mixture is diluted with water when the solvent used is not water, then the pH of the aqueous solution is adjusted to neutral by adding an aqueous solution of hydrochloric acid. The excess of nucleophilic reagent may optionally be removed, for example by extraction with a solvent which is not miscible with water, with chloroform or diethyl ether, or by filtration if it is not soluble in aqueous medium of neutral pH. The clear aqueous solution may be further purified at a later stage through dialysis, cut off 3000 Daltons, first in tap water and then in distilled water. Finally the semi-synthetic glycosaminoglycan of general formula IV is isolated through lyophilization of the aqueous solution by precipitation on addition of a suitable solvent.

The quantity of nucleophilic agent used is between 1 and 200 molar equivalents with respect to the dimer unit of the glycosaminoglycan of general formula III containing the epoxy group, from 10 to 100 equivalents are preferably used. The solvent is selected from among water and polar solvents such as dimethylacetamide, dimethylformamide acetonitrile, dioxane, tetrahydrofuran or their mixtures with water. The inorganic bases preferred are alkaline or alkaline-earth hydroxides preferably sodium or potassium hydroxide, while the preferred organic bases are tertiary amines such as triethylamine.

In a preferred aspect of the invention, the reaction is carried out by adding the semi-synthetic glycosaminoglycan with 2,3 epoxygulonic structure of general formula III, under stirring, to an aqueous solution containing from 10 to 100 equivalent molars of nucleophilic agent with respect to the dimer unit of the glycosaminoglycan of general formula III containing the epoxy group and a quantity of sodium hydroxide sufficient to salify any acidic groups present in the nucleophilic reagent and/or release the same nucleophilic reagent from a possible salt with substances of an acidic nature and to generate an excess of alkalinity so that the reaction mixture is from 0.01N to 5N with respect to the base used. The reaction mixture, in which the concentration of semi-synthetic glycosaminoglycan is preferably between 1% and 5%, is kept under stirring, optionally in an atmosphere of inert gas, at temperatures between 50° and 70° C. for a period between 2 and 6 hours. At the end of the reaction the pH of the mixture is adjusted to neutral with aqueous hydrochloric acid, the excess nucleophilic reagent can be removed by means of extraction with a solvent not miscible with water or by filtration and then the solution may be subjected to dialysis, cut off 3000 Daltons, first with tap water and then with distilled water for a period of time between 6 and 24 hours. The solution is finally subjected to lyophilization or a suitable solvent is added it to obtain the semi-synthetic glycosaminoglycan of general formula IV.

A feature of the semi-synthetic glycosaminoglycans obtained in this way is that they lack α-L-iduronic-2-O-sulfate acid, either entirely or in part, and contain a saccharide unit of α-L-galacturonic acid in which in position 3 a heteroatom, nitrogen, sulphur or oxygen, is present, the heteroatom being part of nucleophilic reagents such as amines, aminoacids, aminoesters, peptides, alcohols, mercaptans, phenols, thiophenols. In this way a covalent bond is introduced between the molecule of the glycosaminoglycans and the nucleophilic group which, by modifying the structural properties of the above-mentioned glycosaminoglycans, improves the possibility of their being absorbed orally and retains their characteristic anti-thrombotic properties with the advantage of showing a significant reduction in the bleeding time and the anti-coagulant activity. In relation to the corresponding natural glycosaminoglycans with heparin or heparan structure, the semi-synthetic glycosaminoglycans described in the present invention thus have the advantage of an antithrombotic and thrombolytic activity which is basically equivalent, accompanied by a lower risk of hemorrhage, as is clearly demonstrated by the pharmacological bleeding tests carried out in vivo on animals, and of being absorbed orally.

The biological activity of the new semi-synthetic glycosaminoglycans, the object of the present invention, was defined through some typical heparin tests. More specifically tests relative to the APTT (Activated Partial Thromboplastin Time), to the time of bleeding and the anti-thrombotic activity were performed.

The APTT activity was defined according to the method of Larrieu N. J. and Weiland G. in Rev. Hematol., 12, 199, (1957).

Each product in examination was dissolved in plasma collected from fasting rats, then scalar dilutions were performed to obtain the concentrations required by the method. Ten determinations were performed for each product and the activity of each product was expressed in terms of concentration in mg/ml, which doubles the time of APTT, that is the plasmatic concentration of the product expressed in mcg/ml is measured which doubles the coagulation time measured in the plasma of rats and expressed as APTT.

The values obtained confirm that the new semi-synthetic glycosaminoglycans show a decrease in anticoagulant power with respect to a standard heparin.

The bleeding time was determined in the rat according to the method described by Dejana E. et al in Thromb. Haemost., 48, 108, (1982). The test is carried out by using non-anesthetized rats of about 300 g weight, administering the compound being investigated and after ten minutes, cutting 2 cm of the tail and measuring the bleeding time with a cronometer result was expressed by calculating the percentage of the time of extension of the bleeding in rats treated with the new semi-synthetic glycosaminoglycans with respect to the control rats.

The new semi-synthetic glycosaminoglycans showed a reduction in the bleeding time with respect to a standard heparin.

Anti-thrombotic activity was determined in the rat by means of the stasis venous thrombosis test described by Reyers S. et al in Thromb. Res., 18, 669–674, (1980). To assess the capacity to prevent the formation of thrombus, the products were injected intravenously into the femoral vein 10 minutes before ligature of the inferior vena cava. After 2 hours the thrombi were removed, dried and weighed.

Anti-thrombotic activity was expressed both as percentage incidence (percentage of rats presenting the thrombus) and as reduction in weight of the thrombus with respect to the control thrombus.

In both cases the results were expressed as $ED_{50}$ in mg/kg.

The results obtained demonstrated that the anti-thrombotic activity of the new semi-synthetic glycosaminoglycans is similar to that of a standard heparin.

Determination of the free amino groups was performed by means of u.v./visible spectrophotometry at 358 nm on the product obtained through reaction with trinitrobenzensulfonic acid (TNBS), according to the method described by Satake K. et al in J.Biochem., 47, 654, (1960), while determination of the sulphur was performed by means of potentiometry. The specific rotatory power was measured in aqueous solution in a 1% concentration.

The $^{13}$C-NMR spectra were performed at 50.3 MHz with a Varian Gemini 200 spectrometer using the sodium salt of 3-(trimethylsilyl) propionic acid deuterated ($D_4$) in the positions 2,2 and 3,3 as internal reference standard.

The standard heparin taken as reference to evaluate the biological activity of the new glycosaminoglycans described in the present invention shows the following values of pharmacological activity according to the tests described above:

APTT (2T)=2.5 mcg/ml
Bleeding time: 111% at 0.5 mg/kg
Anti-thrombotic activity ($ED_{50}$):
Weight loss=0.20 mg/kg
Incidence %=0.40 mg/kg The chemical and physical data relative to standard heparin, taken as reference, and determined with the above-mentioned methods are:

Free amino groups=0.3%
S=10.9%
$^{13}$C-NMR (p.p.m.): 177.5; 105.1; 102.1; 99.5; 80.1; 78.7; 73.9; 72.4; 72.0; 69.2; 62.6; 60.8; 56.7; 24.8.
$[\alpha]^{20}_{546}=+60°$
$[\alpha]^{20}_{589}=+49°$ The examples below must be taken as an illustration of the present invention and not as a limitation of it.

EXAMPLE 1

Semi-synthetic glycosaminoglycan of general formula IV in which —$Z(R_2)R_1$ corresponds to glycyl 400 milligrams of semi-synthetic glycosaminoglycan with 2,3 epoxygulonic structure described in example 3 of EP 0347588 are added to 20 ml of an aqueous solution, containing 4500 mg of glycine and 4000 mg of sodium hydroxide, with a thermostat at 60° C. The reaction mixture Is kept under stirring at 60° C. for 2 hours, then cooled to room temperature and the pH is adjusted to neutral by the addition of a diluted aqueous solution of hydrochloric acid. The solution is then subjected to dialysis, cut off 3000 Daltons, for 12 hours in tap water and for 6 hours in distilled water and is finally lyophilized. 420 mg of the product are obtained with the following analytical and pharmacological characteristics:

Free amino groups=1.5%
$^{13}$C-NMR (p.p.m.): 178.1; 174.9; 105.1; 99.3; 80.1; 77.1; 72.2; 69.0; 68.1; 62.0; 60.3; 59.1; 52.2.
$[\alpha]^{20}_{546}=+54°$
$[\alpha]^{20}_{589}=+45°$
APTT (2T)=16.0 mcg/ml
Anti-thrombotic activity ($ED_{50}$):
Weight loss=0.40 mg/kg
Incidence %=0.65 mg/kg

EXAMPLE 2

Semi-synthetic glycosaminoglycan of general formula IV in which —$Z(R_2)R_1$ corresponds to taurinyl The reaction is performed in the same conditions as described in Example 1 using 3750 mg of taurine instead of 4500 mg of glycine. 430 mg of the product are obtained with the following analytical and pharmacological characteristics:

Free amino groups=1.3%
$^{13}$C-NMR (p.p.m.): 177.4; 105.2; 98.1; 80.1; 79.2; 75.7; 72.1; 71.4; 70.2; 68.4; 61.2; 60.4; 57.3; 48.7; 47.1.
$[\alpha]^{20}_{546}=+59°$
$[\alpha]^{20}_{589}=+48°$
APTT (2T)=14.0 mcg/ml
Anti-thrombotic activity ($ED_{50}$):
Weight loss=0.61 mg/kg
Incidence %=1.22 mg/kg

EXAMPLE 3

Semi-synthetic glycosaminoglycan of general formula IV in which —$Z(R_2)R_1$ corresponds to glycylglycine.

The reaction is carried out under the same conditions as described in Example 1 using 3960 mg of glycylglycine instead of 4500 mg of glycine.

390 mg of the product are obtained with the following analytical and pharmacological characteristics:

Free amino groups=3.5%
$^{13}$C-NMR (p.p.m.): 178.1; 173.4; 105.1; 98.9; 97.8; 80,0; 78.2; 76.4; 69.8; 68.9; 67.2; 60,3; 58,7; 56.9; 52.0; 44,1.
$[\alpha]^{20}_{546}=+55°$
$[\alpha]^{20}_{589}=+43°$
APTT (2T)=16.8 mcg/ml

EXAMPLE 4

Semi-synthetic glycosaminoglycan of general formula IV in which —Z(R$_2$)R$_1$ corresponds to 1,4-diaminobutan-1-yl The reaction is carried out under the same conditions as described in Example 1 using 2630 mg of 1.4-diaminobutan instead of 4500 mg of glycine and 1600 mg of sodium hydroxide instead of 4000 mg.

380 mg of the product are obtained with the following analytical and pharmacological characteristics:
Free amino groups = 10.4%
$^{13}$C-NMR (p.p.m.): 178.1; 99.2; 80.8; 75.9; 72.0; 69.1; 67.2; 61.4; 60.3; 56.7; 51.2; 42.0; 27.3; 26.2.
$[\alpha]^{20}_{546} = +60°$
$[\alpha]^{20}_{589} = +50°$

EXAMPLE 5

Semi-synthetic glycosaminoglycan of general formula IV in which —Z(R$_2$)R$_1$ corresponds to 1-amino-3-carboxypropane, The reaction is carried out under the same conditions as described in Example 1 using 6200 mg of 4-aminobutanoic acid instead of 4500 ml of glycine and 3200 mg of sodium hydroxide instead of 4000 mg and extending the time of reaction to 3 hours.

410 mg of the product are obtained with the following analytical and pharmacological characteristics:
Free amino groups = 1.5%
$^{13}$C-NMR (p.p.m.): 177.8; 105.1; 99.2; 98.7; 80.9; 76.7; 74.8; 72.1; 71.0; 70.3; 69.2; 67.4; 60.9; 59.8; 57.2; 50.8; 34.0; 24.2.
$[\alpha]^{20}_{546} = +58°$
$[\alpha]^{20}_{589} = +49°$
APTT (2T): 19.2 mcg/ml

EXAMPLE 6

Semi-synthetic glycosaminoglycan of general formula IV in which —Z(R$_2$)R$_1$ corresponds to glycyl.

The reaction is carried out under the same conditions as described in Example 1 with the only variation being the use of semi-synthetic glycosaminoglycan with 2,3 epoxygulonic structure described in Example 5 of EP 0347588.

430 mg of the product are obtained with the following analytical and pharmacological characteristics:
Free amino groups = 1.2%
$^{13}$C-NMR (p.p.m.): 178.2; 174.8; 104.8; 99.1; 80.1; 76.8; 72.2; 69.2; 68.2; 62.1; 60.2; 58.7; 52.4
$[\alpha]^{20}_{546} = +55°$
$[\alpha]^{20}_{589} = +42°$
APTT (2T) = 22.2 mcg/ml
Anti-thrombotic activity (ED$_{50}$):
Weight loss = 0.95 mg/kg
Incidence % = 1.1 mg/kg

EXAMPLE 7

Semi-synthetic glycosaminoglycan of general formula IV in which —Z(R$_2$)R$_1$ corresponds to azido.

The reaction is carried out under the same conditions as described in Example 1 using 5200 mg of sodium azide instead of 4500 mg of glycine and 1600 mg of sodium hydroxide instead of 4000 mg and extending the time of reaction to 3 hours.

420 mg of the product are obtained with the following analytical and pharmacological characteristics:
Free amino groups = 1.6%
$^{13}$C-NMR (p,p.m.): 178.1; 100,8; 99.7; 80.1; 79.2; 76.2; 72.4; 71,9; 69.9; 67.8; 64.6; 62.4; 59.9.
$[\alpha]^{20}_{546} = +65°$
$[\alpha]^{20}_{589} = +53°$
APTT (2T) = 13.4 mcg/ml
Anti-thrombotic activity (ED$_{50}$):
Weight loss = 0.24 mg/kg
Incidence % = 0.69 mg/kg

EXAMPLE 8

Semi-synthetic glycosaminoglycan of general formula IV in which —Z(R$_2$)R$_1$ corresponds to (N)-hydroxylamino.

The reaction is carried out under the same conditions as described in Example 1 using 2800 mg of hydroxylamine hydrochloride instead of 4500 ml of glycine.

400 mg of the product are obtained with the following analytical and pharmacological characteristics:
Free amino groups = 1.9%
$^{13}$C-NMR (p.p.m.): 178.4; 178.2; 104.8; 100,8; 99.4; 80.2; 79.1; 75.7; 72.1; 71.8; 9.2; 66.6; 62.3; 59.2.
$[\alpha]^{20}_{546} = +63°$
$[\alpha]^{20}_{589} = +50°$
APTT (2T) = 20.5 mcg/ml
Anti-thrombotic activity (ED$_{50}$):
Weight loss = 0.85 mg/kg
Incidence % = 1.54 mg/kg
Bleeding time: 46.2% at 0.5 mg/kg
79.1% at 1 mg/kg
151.8% at 2 mg/kg

EXAMPLE 9

Semi-synthetic glycosaminoglycan of general formula IV in which —Z(R$_2$)R$_1$ corresponds to methylamino.

500 Milligrams of semi-synthetic glycosaminoglycan with 2,3 epoxygulonic structure described in Example 3 of EP 0347588 are added to 15 ml of an aqueous solution containing 1750 mg of methylamine. The reaction mixture is kept under stirring at 60° C. for 2 hours, cooled to room temperature and then the pH is adjusted to neutral by addition of a diluted aqueous solution of hydrochloric acid. The solution is then subjected to dialysis, cut off 3000 Daltons, for 16 hours in tap water and 6 hours in distilled water and is finally lyophilized. 460 mg of product of the title is obtained with the following analytical and pharmacological characteristics:
Free amino groups = 3.4%
$^{13}$C-NM R (p.p.m.): 178.3; 104.8; 99.3; 98.0; 80.6; 79.1; 74.9; 71.6; 69.0; 66.6; 61.5; 60.5; 36.6.
$[\alpha]^{20}_{546} = +57°$
$[\alpha]^{20}_{589} = +50°$
APTT (2T) = 48.8 mcg/ml
Anti-thrombotic activity (ED$_{50}$):
Weight loss = 0.27 mg/kg
Incidence % = 0.95 mg/kg
Bleeding time: 36.5% at 0.5 mg/kg
57.7% at 1 mg/kg
100% at 2 mg/kg

EXAMPLE 10

Semi-synthetic glycosaminoglycan of general formula IV in which —Z(R$_2$)R$_1$ corresponds to glycyl.

Operating according to the method described in the Example 3 of EP 0347588 on a commercial heparan (OPOCRIN) obtained from bovine spleen, semi-synthetic glycosaminoglycan with 2,3-epoxygulonic structure with general formula III was prepared with the following analytical characteristics:

Free amino groups 2.5%

$^{13}$C-NMR (p.p.m.): 178.0; 177.4; 105.1; 99.6; 98.1; 97.1; 81.0; 78.8; 76.2; 73.3; 71.8; 70.9; 62.1; 60.3; 56.6; 55.9; 54.1; 53.1; 24.5.

$[\alpha]^{20}_{546} = +102°$
$[\alpha]^{20}_{589} = +87°$

400 Milligrams of this semi-synthetic glycosaminoglycan with 2,3-epoxygulonic structure with general formula III were subjected to reaction with glycine under the same conditions as described in Example 1, obtaining 390 mg of the product with the following analytical characteristics:

Free amino groups=2.5%

$^{13}$C-NM R (p.p.m.): 178.0; 176.8; 105.0; 99.6; 99.4; 81.0; 80.1; 79.1; 77.1; 76.3; 73.5; 71,8; 68.0; 62.1; 60,4; 59,1; 56.0; 52.1; 24.4.

$[\alpha]^{20}_{546} = +82°$
$[\alpha]^{20}_{589} = +70°$

We claim:

1. A glycosaminoglycan of molecular weight 3,000–50,000 Daltons, said glycosaminoglycan being derived from heparin or heparan sulfate and exhibiting antithrombotic and thrombolytic activity essentially equivalent to heparin with lower risk of hemorrhage, said glycosaminoglycan having the formula

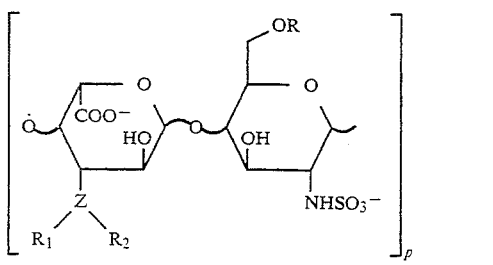

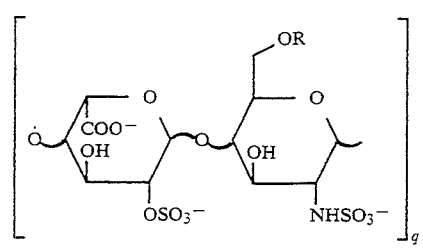

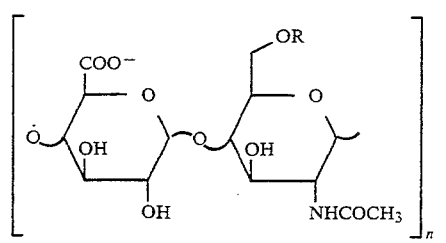

containing the saccharide unit of α-L-galacturonic acid wherein p+q =m, with p other than 0, and m and n are whole numbers of value between 1 and 100, R is hydrogen or the sulfate residue (SO$^-$$_3$) and —Z(R$_2$)R$_1$ is a nucleophilic group, in which Z is nitrogen, R$_1$ is a member selected from the group consisting of unsubstituted or substituted straight C$_1$–C$_{12}$ alkyl, branched C$_3$–C$_{12}$ alkyl, amino, aryl, diazo and hydroxy groups, and R$_2$ is a member selected from the group consisting of hydrogen, straight C$_1$–C$_6$ alkyl, branched C$_3$–C$_6$ alkyl, and when R$_1$ is diazo R$_2$ is absent or R$_1$ and R$_2$ together with Z form a heterocyclic ring.

2. A glycosaminoglycan according to claim 1 wherein R$_1$ is unsubstituted or is a C$_1$–C$_4$ alkyl substituted by a substituent which is a member selected from the group consisting of substituted or unsubstituted amino, carboxy, and sulfonic groups.

3. The glycosaminoglycan according to claim 1 wherein R$^1$ is an alkylene group of 1-4 carbon atoms substituted by —COOH, —SO$_3$H, —CO—NH—CH$_2$—COOH, or —NH$_2$;

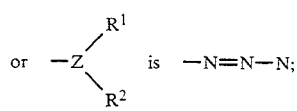

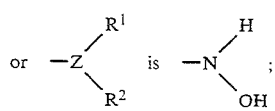

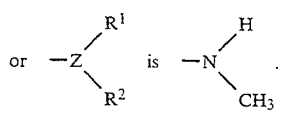

4. The compound according to claim 3 of the formula

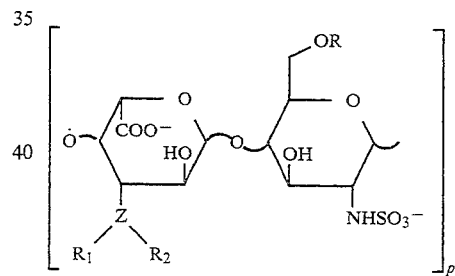

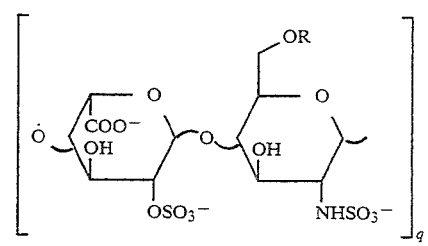

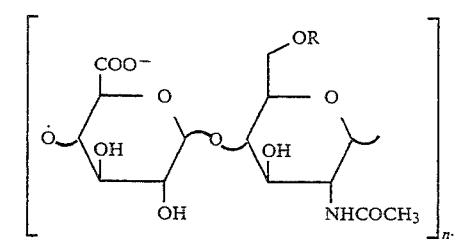

5. The compound according to claim 3 of the formula

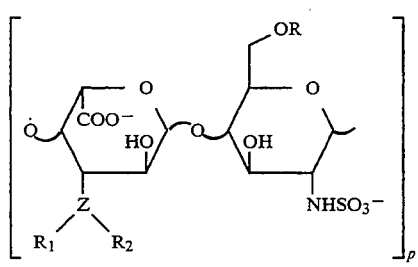
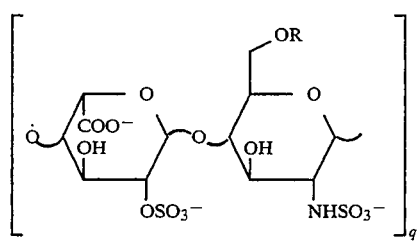
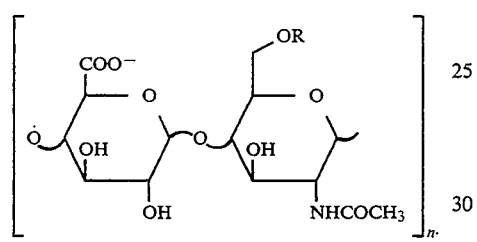
6. The compound according to claim 3 of the formula
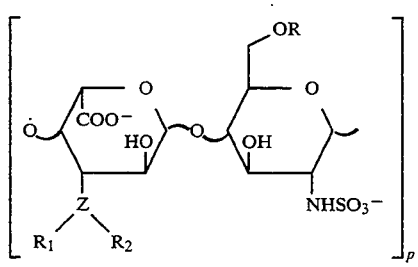
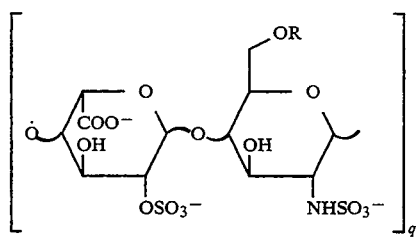
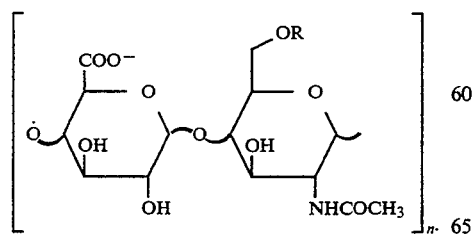
7. The compound according to claim 3 of the formula
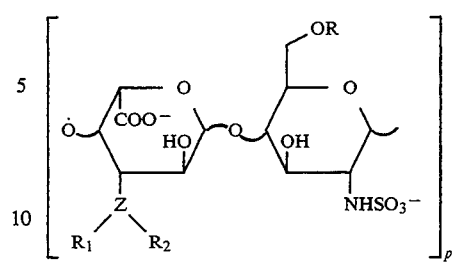
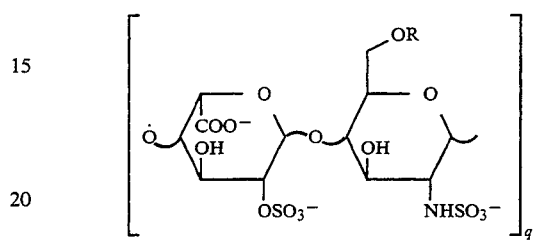
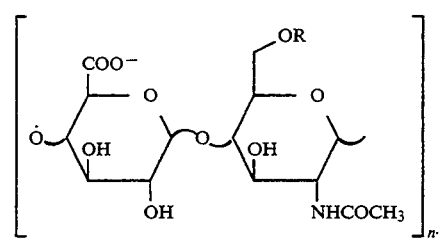
8. The compound according to claim 3 of the formula
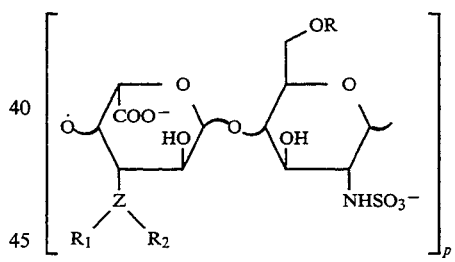
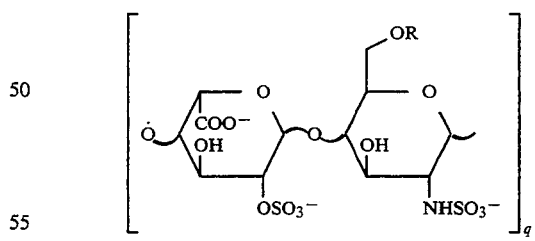
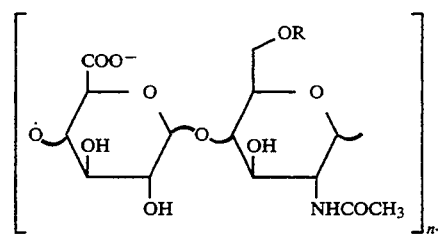
9. The compound according to claim 3 of the formula 10. The compound according to claim 3 of the formula
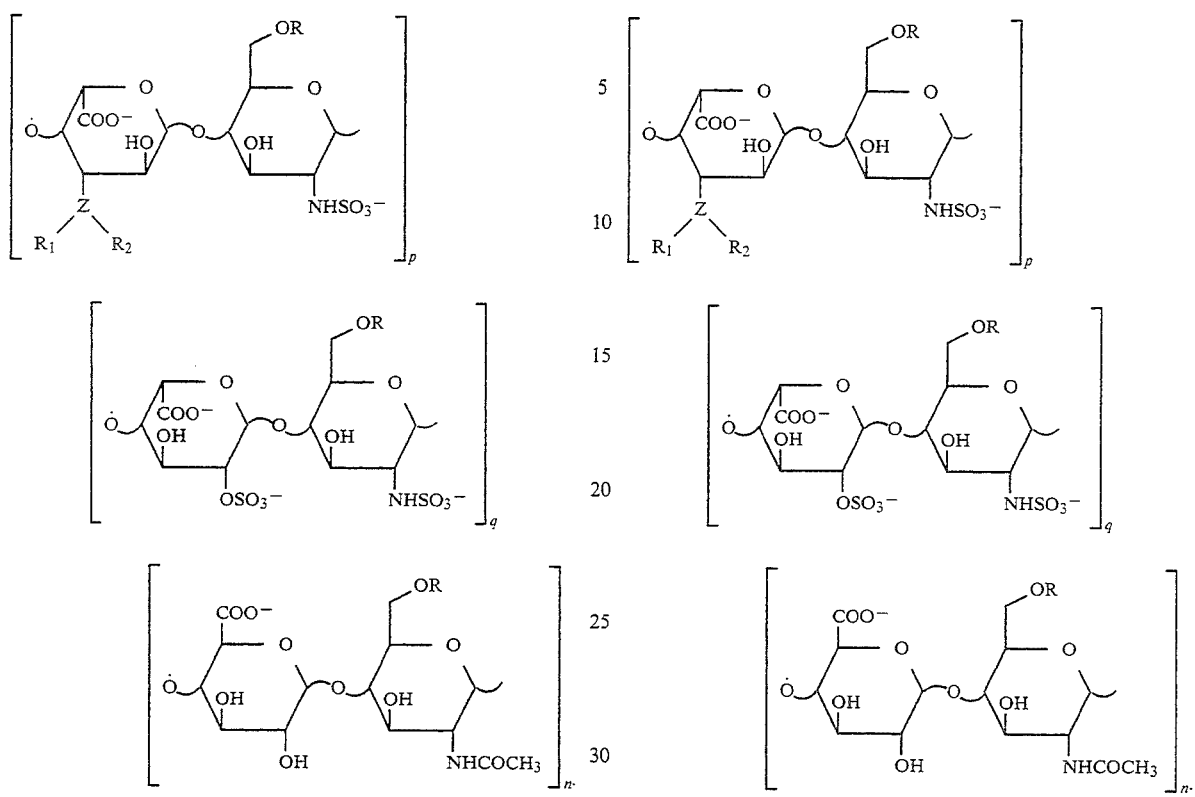
11. The compound according to claim 3 of the formula
12. A process for the synthesis of a glycosaminoglycan of the formula
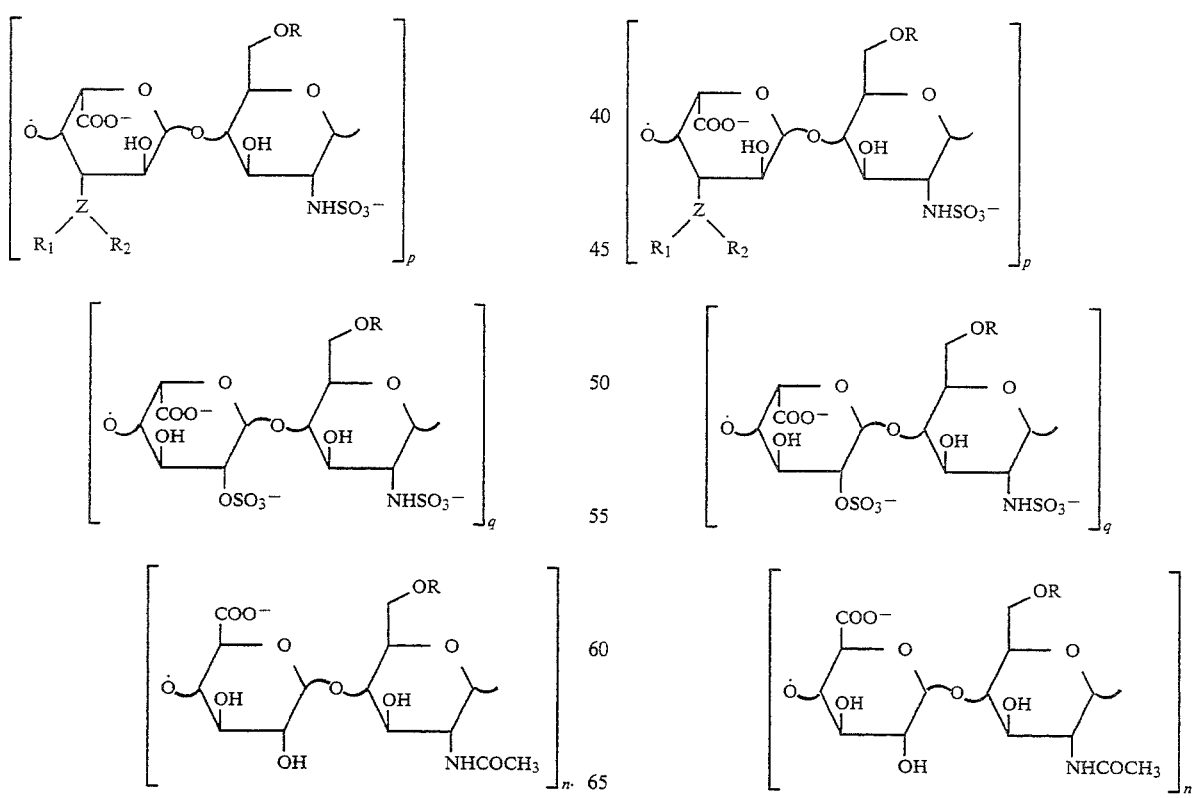
of molecular weight 3,000–50,000 containing the saccharide unit of α-L-galacturonic acid wherein p+q=m, with p other than 0, and m and n are whole numbers of value between 1 and 100, R is hydrogen or the sulfate residue (SO₃) and —Z(R₂)R₁ is a nucleophilic group, in which Z is nitrogen, R₁ is a member selected from the group consisting of unsubstituted or substituted straight $C_1$–$C_{12}$ alkyl, branched $C_3$–$C_{12}$ alkyl, amino, aryl, diazo and hydroxy groups, and R₂ is a member selected from the group consisting of hydrogen, straight chain $C_1$–$C_6$ alkyl, branched $C_3$–$C_6$ alkyl and when $R^1$ is diazo $R^2$ is absent, or R₁ and R₂ together with Z form a heterocyclic ring, which consists of reacting a glycosaminoglycan having a 2,3-epoxygulonic structure of the formula

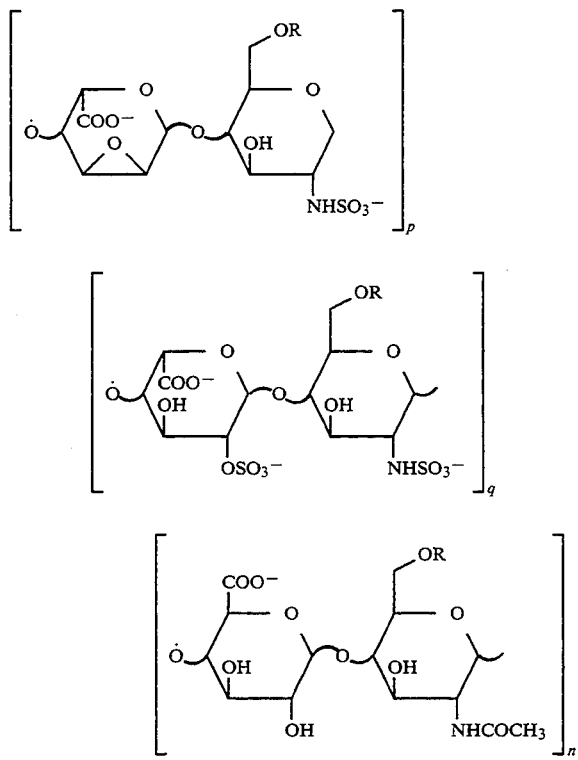

wherein p, q, n. R, R₁, R₂ and Z have the meanings as hereinabove wherein a dimer unit contains an epoxy group with a) a nucleophilic reagent containing said group

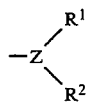

b) or a salt of said nucleophilic reagent in the presence of a solvent and an amount of inorganic or organic base to generate a 0.01–5N excess of alkalinity and when the reaction is carried out with a salt of said nucleophilic reagent also sufficient to release said nucleophilic reagent from said salt and when said R₁ is substituted by an acidic group also sufficient to neutralize said acidic group, keeping the reaction mixture under stirring for a period of time between 2 hours and 6 hours at a temperature between 50° C. and 70° C., in the presence of a solvent which is water or a polar solvent or a mixture of water and said polar solvent, diluting the reaction mixture with water when said solvent is other than water whereby an aqueous solution is obtained, adjusting the pH of said aqueous solution by addition of an aqueous solution of hydrochloric acid, subjecting said aqueous solution to dialysis, first with tap water and then with distilled water and isolating said product by lyophilization of said aqueous solution, said semisynthetic glycosaminoglycan containing the saccharide unit of α-L-galacturonic acid being free of depolymerization with respect to said glycosaminoglycan having the 2,3-epoxygulonic structure.

13. The process according to claim 12 wherein said nucleophilic reagent is a member selected from the group consisting of primary amines, secondary amines, secondary heterocyclic amines, aminoalcohols, aminothiols, aminoacids, aminoesters, peptides, hydroxylamines, hydrazines, hydrazides and sodium azide.

14. The process according to claim 13 wherein said nucleophilic reagent is glycine, glycylglycine, taurine, sodium azide, hydroxylamine, 1,4-diaminobutane, 4-aminobutyric acid or methylamine.

15. The process according to claim 12 wherein said polar solvent is a member selected from the group consisting of dimethylacetamide, dimethylformamide, acetonitrile, dioxane and tetrahydrofuran.

16. The process according to claim 12 wherein said base is an inorganic or organic base.

17. The process according to claim 12 wherein said nucleophilic agent is reacted in an amount between 1 and 200 molar equivalents with respect to said dimer unit of said glycosaminoglycan containing the epoxy group.

18. The process according to claim 17 wherein an excess of said nucleophilic reagent or of said salt thereof is reacted and after the reaction, said excess is removed by extraction with a solvent immiscible with water or by filtration.

19. The process according to claim 16 wherein said base is selected from sodium hydroxide, potassium hydroxide and triethylamine.

20. The process according to claim 12 wherein said reaction of said compound having the 2,3-epoxygulonic structure with said nucleophilic reagent or salt of said nucleophilic reagent is carried out in an atmosphere of inert gas.

* * * * *

UNITED STATES PATENT AND TRADEMARK OFFICE
CERTIFICATE OF CORRECTION

PATENT NO. : 5,430,132
DATED : July 4, 1995
INVENTOR(S) : Silvano Piani, et al

It is certified that error appears in the above-identified patent and that said Letters Patent are hereby corrected as shown below:

On the Title page, item [*] Notice should read --

[*] Notice: The portion of the term of this patent subsequent to April 13, 2013 has been disclaimed.

Signed and Sealed this

Twentieth Day of January, 1998

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,430,132
DATED : JULY 4, 1995
INVENTOR(S) : SILVANO PIANI, ET AL

It is certified that error appears in the above-identified patent and that said Letters Patent is hereby corrected as shown below:

CLAIM 4, column 14, lines 35-45, amend the first portion to read: --

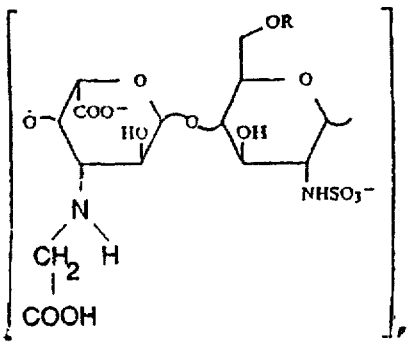

CLAIM 5, column 15. lines 4-12, amend the first portion to read: --

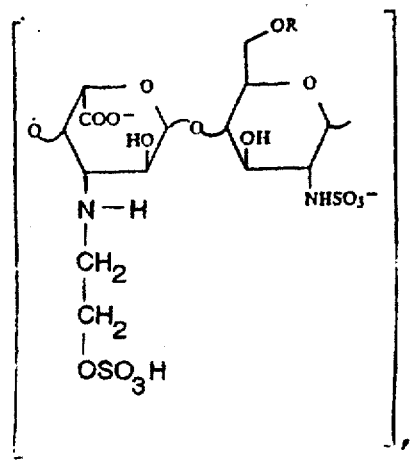

UNITED STATES PATENT AND TRADEMARK OFFICE
CERTIFICATE OF CORRECTION

PATENT NO. : 5,430,132
DATED : JULY 4, 1995
INVENTOR(S) : SILVANO PIANI, ET AL

It is certified that error appears in the above-identified patent and that said Letters Patent is hereby corrected as shown below:

CLAIM 6, column 15, lines 35-45, correct the first portion to read: --

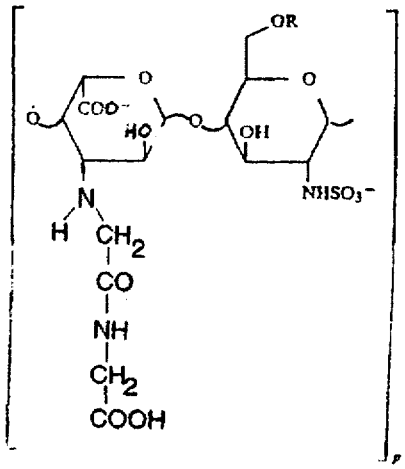

CLAIM 7, column 16, lines 4-12, correct the first portion to read: --

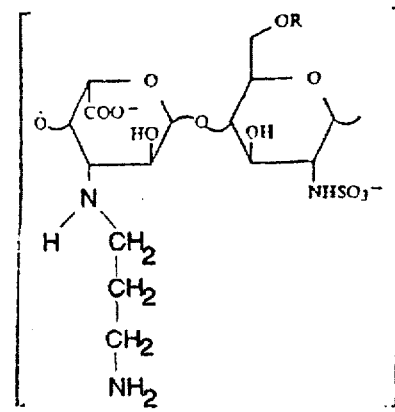

UNITED STATES PATENT AND TRADEMARK OFFICE
CERTIFICATE OF CORRECTION

PATENT NO.  : 5,430,132                           PAGE 3 of 4
DATED       : JULY 4, 1995
INVENTOR(S) : SILVANO PIANI, ET AL

It is certified that error appears in the above-identified patent and that said Letters Patent is hereby corrected as shown below:

CLAIM 8, column 16, lines 35-45, correct the first portion to read: --

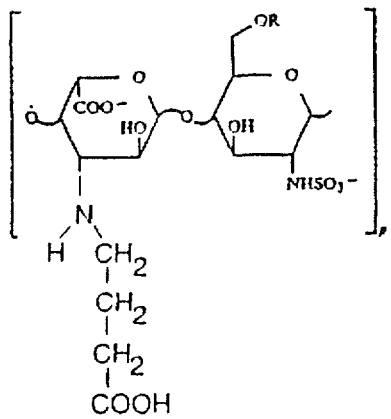

CLAIM 9, column 17, lines 4-12, correct the first portion to read as follows:

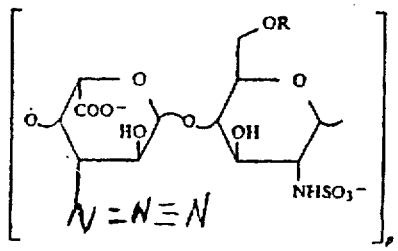

UNITED STATES PATENT AND TRADEMARK OFFICE
CERTIFICATE OF CORRECTION

PATENT NO.  : 5,430,132
DATED       : JULY 4, 1995
INVENTOR(S) : SILVANO PIANI, ET AL

It is certified that error appears in the above-identified patent and that said Letters Patent is hereby corrected as shown below:

CLAIM 10, column 17, lines 35-45, amend the first portion to read:

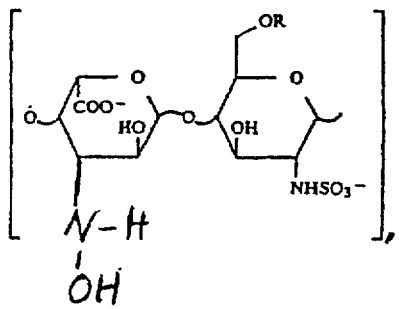

CLAIM 11, column 18, lines 4-12, amend the first portion to read:

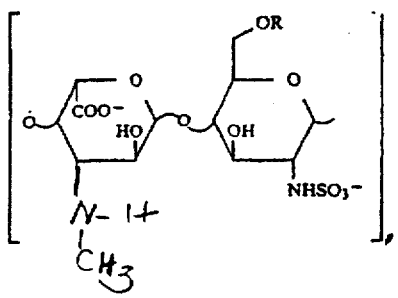

Signed and Sealed this

Thirteenth Day of October 1998

*Attest:*

BRUCE LEHMAN

*Attesting Officer*   *Commissioner of Patents and Trademarks*